(12) United States Patent
Hoste et al.

(10) Patent No.: US 12,244,757 B2
(45) Date of Patent: Mar. 4, 2025

(54) COMPUTER-IMPLEMENTED DETECTION OF ANOMALOUS TELEPHONE CALLS

(71) Applicant: CALLTIC NV, Zwijnaarde (BE)

(72) Inventors: Filip Hoste, Jabbeke (BE); Guy Van Der Meeren, Zwijnaarde (BE); Brecht Desplanques, Lichtervelde (BE); Kris Demuynck, Lauwe (BE)

(73) Assignee: CALLTIC NV, Zwijnaarde (BE)

( * ) Notice: Subject to any disclaimer, the term of this patent is extended or adjusted under 35 U.S.C. 154(b) by 348 days.

(21) Appl. No.: 17/758,915

(22) PCT Filed: Jan. 22, 2021

(86) PCT No.: PCT/EP2021/051504
§ 371 (c)(1),
(2) Date: Jul. 15, 2022

(87) PCT Pub. No.: WO2021/148636
PCT Pub. Date: Jul. 29, 2021

(65) Prior Publication Data
US 2023/0048264 A1    Feb. 16, 2023

(30) Foreign Application Priority Data

Jan. 23, 2020   (BE) .................................. 2020/5043

(51) Int. Cl.
*H04M 3/22*   (2006.01)
*G10L 17/02*   (2013.01)
*G10L 17/04*   (2013.01)

(52) U.S. Cl.
CPC ........... *H04M 3/2281* (2013.01); *G10L 17/02* (2013.01); *G10L 17/04* (2013.01); *H04M 2203/6027* (2013.01)

(58) Field of Classification Search
CPC ....... H04M 3/2281; H04M 2203/6027; H04M 3/2218; H04M 3/42059; H04M 7/0078;
(Continued)

(56) References Cited

U.S. PATENT DOCUMENTS 5,495,521 A * 2/1996 Rangachar ........... H04Q 3/0016
                                                       379/189
8,051,134 B1 * 11/2011 Begeja .................. H04L 51/212
                                                       709/206
(Continued)

FOREIGN PATENT DOCUMENTS

| EP | 2509294 B1 | 10/2012 |
|---|---|---|
| WO | 2020/159917 A1 | 8/2020 |
| WO | 2021/148636 A1 | 7/2021 |

OTHER PUBLICATIONS

ISR-WO for parent application PCT/EP2021/051504 and dated Mar. 17, 2021.
(Continued)

*Primary Examiner* — Kabir A Timory
(74) *Attorney, Agent, or Firm* — Vorys, Sater, Seymour and Pease, LLP

(57) ABSTRACT

Computer-implemented detection of anomalous telephone calls, for example detection of interconnect bypass fraud, is disclosed. A telephone call associated with user devices is analyzed remote from the user devices. A first set of multiple features, for example Mel Frequency Cepstral Coefficients, is derived from a call audio stream. The first set is converted to an embedding vector, for example via a model based on a Universal Background Model comprising a Gaussian Mixture Model, which model is preferably configured based on a training plurality of first sets of multiple features derived form a corresponding training plurality of audio streams. Occurrence, or probability of occurrence, of an anomalous telephone call is determined based on the embed-
(Continued)

ding vector, for example via a back-end classifier, such as a Gaussian Backend Model, which classifier is preferably configured based on labels associated with the training plurality of audio streams.

17 Claims, 5 Drawing Sheets

(58) Field of Classification Search
CPC ......... H04M 3/42008; H04M 2201/41; H04M 2203/152; G10L 17/02; G10L 17/04; G10L 17/08; H04L 63/1425; H04L 65/65; H04L 65/1076; H04L 63/0861; H04L 65/1069; H04L 9/3231; G06F 21/32
See application file for complete search history.

(56) References Cited

U.S. PATENT DOCUMENTS

| | | | |
|---|---|---|---|
| 9,037,113 | B2 | 5/2015 | Balasubramaniyan et al. |
| 9,232,052 | B1 | 1/2016 | Laks et al. |
| 9,729,727 | B1 * | 8/2017 | Zhang .................. H04M 15/56 |

OTHER PUBLICATIONS

Reynolds, Quatieri, and Dunn, entitled "Speaker Verification Using Adapted Gaussian Mixture Models", in Digital Signal Processing 10, 19-41 (2000), doi: 10.1006/dspr.1999.0361.

Najim Dehak et al., entitled "Front-end factor analysis for speaker verification" in IEEE Transactions on Audio Speech and Language Processing 19(4):788-798 Jun. 2011, DOI: 10.1109/TASL.2010.2064307.

Snyder, Garcia-Romero, Sell, Povey and Khudanpur, entitled "X-Vectors: Robust DNN Embeddings for Speaker Recognition", in 2018 IEEE International Conference on Acoustics, Speech and Signal Processing (ICASSP), doi: 10.1109/ICASSP.2018.8461375.

Desplanques and Martens, entitled "Model-based speech/non-speech segmentation of a heterogeneous multilingual TV broadcast collection", in 2013 IEEE International Symposium on Intelligent Signal Processing and Communication Systems (ISPACS), doi: 10.1109/ISPACS.2013.6704522.

Prince and Elder, entitled "Probabilistic Linear Discriminant Analysis for Inferences about Identity", in 2007 IEEE International Conference on Computer Vision, doi: 10.1109/ICCV.2007.4409052.

* cited by examiner

COMPUTER-IMPLEMENTED DETECTION OF ANOMALOUS TELEPHONE CALLS

FIELD OF THE INVENTION

The present invention pertains to computer-implemented methods, computer systems and computer program products for detecting anomalous telephone calls, in particular detecting interconnect bypass fraud, in telephonic communication networks.

BACKGROUND

EP 2 509 294 B1 discloses a system for detecting an "interconnect bypass" in telecommunication networks, especially in wireless telecommunication networks such as for example of the type GSM, GPRS, UMTS or similar, but also in wired telecommunication networks, based on test calls. Such an interconnect bypass is also known as a "GSM gateway" or "SIM box" when it concerns a wireless telecommunication network, see e.g. https://en.antrax.mobi.

Reference is made to FIG. 1. A local (e.g. national) telephone service provider (105, e.g. a mobile network operator) may handle a wide variety of telephone calls between parties. Some telephone calls may be local telephone calls. Some telephone calls may be non-local (e.g. international) telephone calls. Local telephone calls are typically much cheaper than non-local telephone calls, in part due to higher charges of the local telephone service provider.

Sometimes an international call from a calling party (140) to a designated receiver (102), which is routed (143, 144) via one or more international carriers, is not delivered directly from an international carrier (144) to a local telephone service provider (105). In order to circumvent higher charges of the local telephone service provider, the international call is routed, e.g. via VoIP, to an intermediate device (101), such as a SIM box, of a bypass operator. The intermediate device (101) is associated with an intermediate local subscriber identification, e.g. it comprises one or more SIM cards of a local telephone service provider (105), via which it can establish a local telephone call with the designated receiver (102), for which no higher charges apply. Typically, use of a subscriber identification (e.g. SIM card) for an interconnect bypass is contractually prohibited. Local telephone service providers wish to detect subscriber identifications used for interconnect bypassing.

FIG. 1 shows the type of calls which a local telephone service provider (105, e.g. mobile network operator) wishes to distinguish:
- telephone calls which actually originate locally (111); and
- telephone calls which originate non-locally (140), but appear to be local as they are passed from a telephone service provider (142) via one or more non-local (e.g. international) carriers (143, 144) to an intermediate device (101) associated with a local subscriber identification.

In the latter case, two calls are established: a first call between the calling party (140) and the intermediate device (101) and a second call between the intermediate device (101) and the designated receiver (102). The intermediate device connects the speech channels of both calls, to enable communication between the calling party (140) and the designated receiver (102).

Locally, the subscriber identification of the sending party (101, 111) and the designated receiver (102) can be associated with the same local telephone service provider, also called "on-net" calls, as depicted in FIG. 1, but can alternatively also be associated with different local or even international telephone service providers, also called "off-net" calls or in the case of international telephone service providers "international off-net" calls, which case is not depicted in FIG. 1, but which case is also subject of the present invention. FIG. 1 further depicts switching centers (145, 146, 147, 106, 107), such as mobile switching centers (MSC) or media gateways (MGW), and base transceiver stations (BTS, 103, 104). While FIG. 1 specifically depicts mobile base transceiver stations, the present invention can also be utilized for wired telephone networks and/or VoIP networks, e.g. an intermediate device connected to a local landline.

Known detection methods for interconnect bypass include test calls, call profiling, user profiling, location detection, and network protocol analysis.

Bypass operators may circumvent known methods via e.g. receiving local calls, intermediate device movement, artificial call diversification, and test call tracking.

Known detection methods suffer from countermeasures by bypass operators and false positives. Furthermore, new SIM cards are cheap and easy to acquire, so detection needs to be fast. With, for example, a cost of €0.5/SIM card, average call durations of 2 minutes, and a profit of €0.2/minute, bypass detection preferably occurs within the initial three calls, as otherwise interconnect bypass becomes profitable and hence exploited. There is a need for interconnect bypass detection which is very fast (e.g. within initial three calls), complete (retrieve both on-net and off-net fraudulent SIM cards), accurate (mitigate false positives), cannot be circumvented and has a low impact on resources.

U.S. Pat. No. 9,037,113 B2 discloses systems and methods for detecting call provenance from call audio, in particular determining at least one of a noise profile, packet loss characteristics, and speaker-independent artifacts associated with call audio received at a user device participating in the call. U.S. Pat. No. 9,037,113 B2 is concerned with detecting call provenance, and remains silent on interconnect bypass fraud detection. U.S. Pat. No. 9,037,113 B2 furthermore, in column 13 lines 18 to 22, teaches away from mechanisms for analyzing call audio which are dependent of call participant voices, including voiceprint, accent, speech patterns, pitch (i.e. frequency), volume (i.e. amplitude), and various other voice factors.

Call analysis on a user device requires cooperation, and is hence unsuitable for interconnect bypass fraud detection. The present invention aims to detect a variety of types of anomalous telephone calls, including interconnect bypass fraud.

The present invention aims to resolve at least some of the problems mentioned above.

SUMMARY OF THE INVENTION

In a first aspect, the present invention provides a computer-implemented method (CIM) for detecting an anomalous telephone call, in particular detecting interconnect bypass fraud, according to claim 1.

In a second aspect, the present invention provides a computer system for detecting an anomalous telephone call, in particular detecting interconnect bypass fraud, wherein the computer system comprises means configured for carrying out the CIM according to the first aspect.

In a third aspect, the present invention provides a computer program product (CPP) for detecting an anomalous telephone call, in particular detecting interconnect bypass fraud, wherein the CPP comprises instructions which, when the CPP is executed by a computer, cause the computer to carry out the CIM according to the first aspect.

The present invention is advantageous as it allows for very fast, complete and accurate detection of an anomalous telephone call, in particular detection of interconnect bypass fraud, with a low impact on resources, and which is remotely from user devices. Further advantages are disclosed in the detailed description below.

DETAILED DESCRIPTION OF THE INVENTION

The present invention concerns a computer-implemented method (CIM), a computer system and a computer program product (CPP) for detecting an anomalous telephone call, in particular detecting interconnect bypass fraud. The invention has been summarized in the corresponding section above. In what follows, the invention is described in detail, preferred embodiments of the invention are discussed, and the invention is illustrated by means of non-limiting examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10°% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, steps, known in the art or disclosed therein.

"Based on" as used herein is synonymous with "based at least in part on" and is an inclusive or open-ended term that specifies the presence of what follows and does not exclude or preclude the presence of additional, non-recited components, features, elements, members, steps, known in the art or disclosed therein.

A "telephone service provider" as used herein may be a landline telephone provider, a mobile network operator or a Voice over IP (VoIP) provider.

Figure 1:
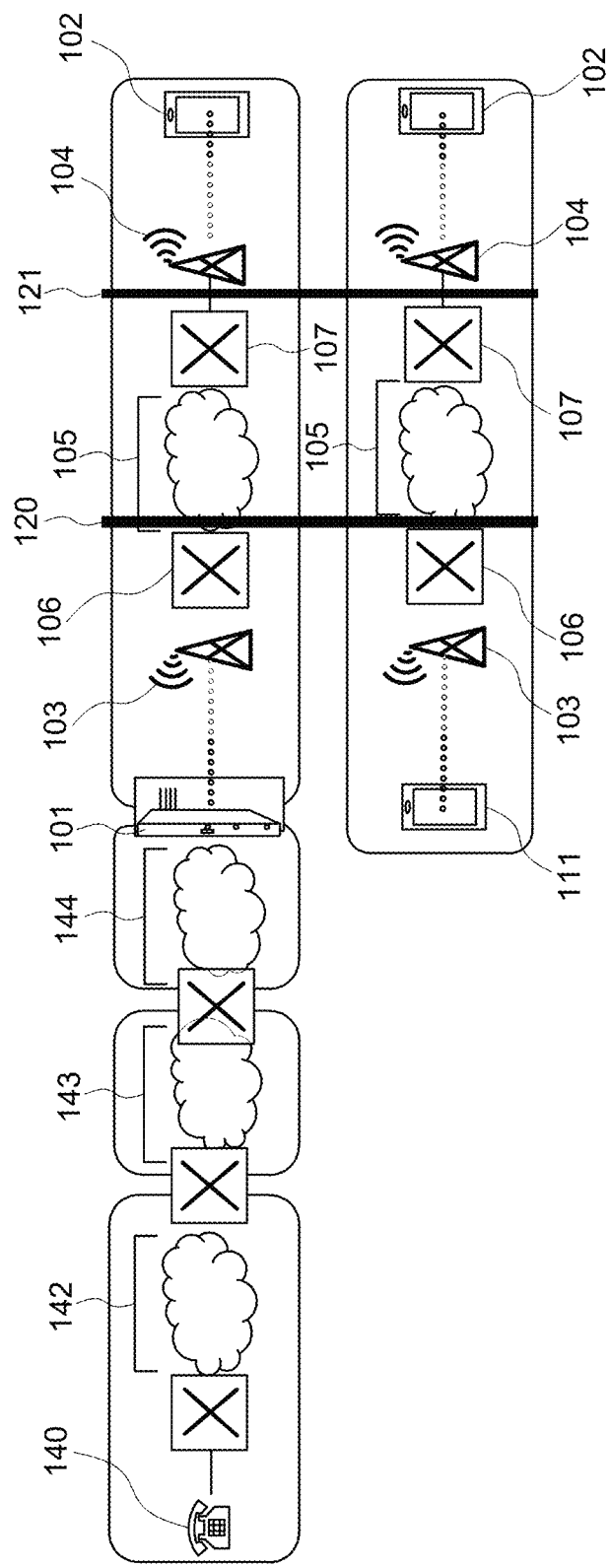
FIG. 1 shows a schematic overview for illustrating differences between regular local telephone calls and telephone calls associated with interconnect bypass fraud.

A "user device" as used herein is any device suitable for establishing in conjunction with a subscriber identity a call with a telephone service provider. This may be, for example, a smartphone, a SIM box, a landline or a VoIP client running on a computer or another suitable device. With reference to exemplary FIG. 1, telephones (140, 102, 111) and the intermediate device (101) are user devices. A user device may be associated with a user device identification number, such as an International Mobile Equipment Identity (IMEI).

A "subscriber identity" as used herein is any identification suitable for utilizing communication services from a telephone service provider. A non-limiting list of types of subscriber identities includes a Subscriber Identity Module (SIM) card, an International Mobile Subscriber Identity (IMSI) which may be stored in a SIM card, a Mobile Station International Subscriber Directory Number (MSISDN) which may associate a telephone number with a SIM, a Calling Card, a PBX connection, a VoIP subscription, a Skype account, and a WhatsApp account.

Aspects of the Present Invention

In a first aspect, the present invention provides a computer-implemented method (CIM) for detecting an anomalous telephone call, in particular a CIM for detecting interconnect bypass fraud. In a second aspect, the present invention provides a computer system for detecting an anomalous telephone call, in particular a computer system for detecting interconnect bypass fraud. The computer system comprises means configured for carrying out the CIM according to the first aspect. In a third aspect, the present invention provides a computer program product (CPP) for detecting an anomalous telephone call, in particular a CPP for detecting interconnect bypass fraud. The CPP comprises instructions which, when the CPP is executed by a computer, such as a computer system according to the second aspect, cause the computer to carry out the CIM according to the first aspect. The invention may furthermore provide a tangible non-transitory computer-readable data carrier comprising the CPP. The three aspects of the invention are hence interrelated. Therefore, each feature disclosed above or below may pertain to each of these aspects, even if it has been disclosed in conjunction with a particular aspect.

The CIM comprises the step of analysing a telephone call associated with at least two user devices. The step of analyzing the call comprises substeps. A call audio stream of the call is obtained. From the call audio stream, a first set of multiple features is derived. An occurrence, or a probability of occurrence, of an anomalous telephone call, in particular interconnect bypass fraud, is determined based on the first set of features.

A telephone call encompasses at least one call audio stream (unidirectional call audio transmittance), and typically two call audio streams (bidirectional call audio transmittance). Typically, a number of call audio streams up to the number of parties participating in a telephone call, which may be larger than two, can be present. One of ordinary skill in the art will appreciate that in view of quality or type of apparatuses, audio originating from a non-communicating party (e.g. a party temporarily not talking during conversation) can be refrained from being transmitted in a corresponding call audio stream (e.g. for repressing noise echo effects in case of acoustic coupling of a speaker and a microphone or for saving bandwidth usage).

In the course of a call trajectory, a call audio stream can be converted, i.e. the call audio represented based on a first codec in a first call audio stream can be converted based on a second codec to a second call audio stream. A non-limiting list of examples of codecs comprises G711, G729, HR, FR, EFR, AMR and AMRWB.

A call trajectory can furthermore introduce network artifacts in a call audio stream, for example due to delays, bit flips, jitter or packet loss. A call audio stream may hence contain network artifacts, e.g. quality deterioration, which may include an indication regarding its trajectory.

In addition to mere codec conversion, further artifacts can also be introduced in a call audio stream, for example noise, background noise, radio interference, delay, crosstalk, clipping, packet loss concealment and interworking of voice activity detection.

The advantage of detecting occurrence of an anomalous telephone call via analysis of the call audio stream, is the difficulty to tamper with the call audio stream. This has to be contrasted with metadata. For interconnect bypass, for example, while the right person speaking (call audio stream) via an unknown telephone number (metadata) might be acceptable for both parties, absence of or a heavily adjusted call audio stream is unacceptable.

Furthermore, it is difficult, if not impossible, to remove or mask artifacts included due to the trajectory.

The call audio stream (or streams) are therefore ideal target candidates for analysis in order to detect an anomalous telephone call.

In a preferred embodiment, the call is analysed remote from the at least two user devices. Preferably, the call audio stream is obtained at infrastructure of a telephone service provider (e.g. lines 120 or 121 in FIG. 1). Preferably, the first set of features is derived from the call audio stream at said infrastructure. Preferably, the occurrence, or the probability of occurrence, of an anomalous telephone call is determined at said infrastructure.

Analyzing the call remote from the at least two user devices, such as at infrastructure of a telephone service provider, is advantageous as it does not require cooperation of a user of a user device, which user may object to cooperation, e.g. when conspiring in fraud or being indifferent to fraud. It furthermore does not require consumption of computational resources, and hence battery power, at a user device, which is most often a handheld mobile telephone, in particular a smartphone. It furthermore allows for a limited number of measurement points while still providing good coverage. A measurement point is in the context of this document a point in a telecommunication network where call audio is obtained.

In a preferred embodiment, the first set of features is converted to an embedding vector of multiple features, wherein the embedding vector and the first set differ.

The occurrence, or the probability of occurrence, of an anomalous telephone call, in particular interconnect bypass fraud, is then determined based on the embedding vector. Preferably, the first set of features is converted via a model to an embedding vector of multiple features. Preferably, the model is determined based on a training plurality of first sets of multiple features derived from a corresponding training plurality of audio streams. Preferably, each audio stream of the training plurality of audio streams is associated with a label denoting either one of occurrence or non-occurrence of an anomalous telephone call. The training plurality of audio streams may be obtained based on conventional methods in the art, such as, but not limited to, for example, test calls.

Embedding extraction is a technique to condense complex data such as high-dimensional data or variable length sequential data into a compact and informative low-dimensional real vector. The low-dimensional real vector is the embedding vector. To allow easy processing in the subsequent processing blocks in the overall system, embedding vectors typically have a fixed dimension. The models for embedding extraction are learned on large amounts of labeled or unlabeled data by optimizing some well-chosen criterion. With a proper choice of the optimization criterion, the extracted embedding vectors preserve most if not all information relevant to the task, and even manage to organize the information in a topologically sound way, i.e. items that are similar in some way are located closely together in a sub-space of the embedding space.

A well-designed optimization criterion is especially important for unsupervised training, i.e. when training using unlabeled data. One example of an optimization criterion suited for unsupervised training is consistency training. Consistency criterion states that every training example should resemble itself under a set of plausible alterations and should be as different as possible from all other training examples. What is considered plausible alterations is task specific. In image processing one may consider changes in perspective, lighting, or image cropping, while in speech processing, one may consider changes in background noise, changes in tempo or variations due to audio compression as plausible alterations.

Models for embedding extraction can be trained on data related to the task but not specific to that task. This is a form of transfer learning. For example, in a system for detecting anomalous telephone calls, aspects such as speaker characteristics or spoken language and dialects can be learned on any type of telephone speech or even non-telephone speech. This property of embedding extraction allows one to create models for embedding extraction on large amounts of pre-existing data. The resulting models for embedding extraction can be used later on as generic information extractor for a large set of related tasks. The fact that an efficient information extraction sub-system can be trained with only weak constraints on labels and data quality significantly reduces the amount of effort one must spend on task-specific data collection and labeling.

The dimensionality of the embedding vector controls the amount of detail that can be encoded. For example, in a system for detecting anomalous telephone calls the complex input data is the variable length call audio stream or a first set of features derived from that call audio stream. The model for embedding extraction condenses information regarding speaker, language, dialect, telephone line conditions, background noise, etc. from a rate of for instance 150 000 or more first set features per minute speech into a low-dimensional embedding vector with typical dimensions of 64 to 2048. This huge compression of the data flow while preserving the task relevant information allows for fast and efficient processing and storage of the audio streams. The more dimensions the embedding vector has, the more accurately the embedding vector will represent a relationship between first set of features of multiple call audio streams. However, larger dimensions will also include more call-specific details, which in turn leads to an increased chance in overfitting, to slower training of the system, and to higher computational load when employing the system.

Note that embedding vectors are an intermediate representation only. The remainder of the system will further process the information contained in the embedding to solve the actual problem. The model for embedding extraction can be incorporated as a fixed component in the overall system, or it can be used as an initial model that is gradually fine-tuned by optimizing a well-chosen criterion on task-specific data. If sufficient amounts of task-specific data are available, one can even train both the embedding extractor and the final classifier in a single training effort. In a preferred embodiment of the invention, the model for embedding extraction is incorporated as a fixed component in the overall system. Embedding extraction is beneficial to reduce the broad and complex first set of features into a compact vector characterizing a call audio stream in many aspects and useful for many applications. A subsequent backend-classifier then further fine-tunes the information extraction to a specific application, for instance anomalous telephone call detection, and more specifically interconnect bypass fraud or revenue share fraud.

A two-step feature determination is advantageous as it allows for very fast, complete and accurate detection of an anomalous telephone call, in particular detection of interconnect bypass fraud, with a low impact on resources. The call audio stream may comprise a substantial amount of data, i.e. a large number of bits and/or a large bit rate. Working directly with an accurate yet computationally expensive detection algorithm on the full call audio stream places a high burden on required resources. Therefore, a first set of multiple features may be derived from the call audio stream, most preferably with a computationally manageable algorithm, thereby most preferably significantly reducing the amount of data. The first set of multiple features may thereby provide intermediate data for subsequent analysis in function of the detection.

The intermediate data is the data comprised in the embedding vector.

First Set of Multiple Features

In a preferred embodiment, the first set of multiple features, i.e. a digital representation of the first set of multiple features, comprises less bits than the call audio stream.

In a preferred embodiment, the features of the first set are predetermined (i.e. 'hand-engineered'). One of ordinary skill in the art will appreciate that predetermined features encompass a predetermined functional dependency on at least a portion of the call audio stream. One of ordinary skill in the art will also appreciate that numerical values of predetermined features are dependent on the specific audio stream under consideration and hence not predetermined.

In a preferred embodiment, the first set of multiple features comprises features derived from a power spectrum of at least a portion of the call audio stream. Preferably, the call audio stream is a time domain bit stream representation of the call audio. A pre-emphasis filter may be applied to the call audio stream. The call audio stream may be partitioned into subsequent stream windows, i.e. subsequent portions of the call audio stream in the time domain. Alternatively, portions of the call audio stream may be obtained via a sliding window. Preferably, a power spectrum is computed for each stream window or instance of the sliding window. Alternatively, a power spectrum is computed for the entire call audio stream. Preferably, the power spectrum is based on a Fourier Transform, such as a Fast Fourier Transform. Alternatively, the power spectrum is based on a Discrete Cosine Transform, a Discrete Sine Transform or a Discrete Wavelet Transform. The first set of multiple features may comprise at least a part of the power spectrum. Preferably, the power spectrum is converted into multiple values via a corresponding number of different filters in the frequency domain, optionally followed by one or more functions, preferably a logarithm. The filters may be linear, triangular, rectangular or trapezoidal. The first set of multiple features may comprise the multiple values. Alternatively or additionally, one or more further functions may be applied on the multiple values, such as a discrete cosine transform, obtaining coefficients. The first set of multiple features may comprise the coefficients. A non-limiting list of coefficients are time frequency features such as based on the human hearing and speech system such as Mel Frequency Cepstral Coefficients, Linear Prediction Coefficients, Linear Prediction Cepstral Coefficients, Line Spectral Frequencies and Perceptual Linear Prediction Coefficients.

In a further embodiment the said filters may also be Gaussian.

In a preferred embodiment, the first set of multiple features comprises speaker-dependent features suitable for speaker recognition and/or speaker differentiation. A non-limiting list of features suitable for speaker recognition and/or speaker differentiation comprises Mel Frequency Cepstral Coefficients, Linear Prediction Coefficients, Linear Prediction Cepstral Coefficients, Line Spectral Frequencies, Discrete Wavelet Transform features, and Perceptual Linear Prediction Coefficients.

In an embodiment, the first set of multiple features comprises Mel Frequency

Cepstral Coefficients (MFCC). In a preferred embodiment, the first set of features consists of MFCC.

The Applicant has surprisingly found that, although features based on the human hearing and speech system are particularly tailored towards audio and speech processing, wherein channel-specific artifacts are a nuisance, a first set of multiple features comprising MFCC are particularly fruitful in reducing the amount of data of the call audio stream to a manageable amount with an acceptable amount of computational resources, while at the same time retaining sufficient information for detecting anomalous telephone calls, in particular detecting interconnect bypass fraud.

In particular for interconnect bypass fraud, local calls are to be distinguished from international calls bypassed via a local subscriber identity/intermediate device of a bypass operator. Speaker differentiation is for this purpose very useful as it can be expected that a limited number of speakers makes use of a single user device. A lot of different speakers can indicate that the user device is in fact an intermediate device used for interconnect bypass fraud. The Applicant, in considering speaker-dependent features suitable for speaker recognition and/or speaker differentiation, has surprisingly found that despite a deterioration in quality of such features for speaker recognition for bypassed international calls in comparison with national calls, these features allow to consistently and precisely discriminate bypassed international calls and national calls, and has advantageously converted this finding to the present invention. Additionally the Applicant also discovered that the influence of the deterioration in quality on the speaker-dependent features is on itself an indication of interconnect bypass fraud. The Applicant has tested several types of such features and found them to be advantageous for the present invention, with particularly advantageous results for features based on the human hearing and speech system. As described above, such features are utilized for detection of an anomalous telephone call based on the features associated with a single call. Moreover, since they are derived in the process, they can also be advantageously utilized for determining speaker differentiation over multiple calls associated with a local subscriber identity, for further improvement of the detection of anomalous telephone calls, as detailed further below.

Without wishing to be bound by theory, and in hindsight of the surprising finding, the Applicant deems that in addition to quality reduction (packet losses, noise), a call trajectory may also at least partially reshape a voice spectrum, for example by a series of encodings and decodings, potentially with different codecs, in particular noting that a SIM box routes a call over an air interface, in view of which the above disclosed speaker-dependent features have appeared to be surprisingly fruitful for detecting anomalous telephone calls.

Embedding Vector of Multiple Features

In a preferred embodiment, the features of the embedding vector according to the model are automatically generated based on a target variability criterion.

The features of the embedding vector correspond with the dimensions of the embedding vector and are quantified by a real value for every dimension. As described in a previous embodiment, the first set of features is converted via a model to an embedding vector of multiple features. This is done automatically by optimizing a target variability criterion, which is defined by target labels linked with the call audio streams. In the case of anomalous telephone call detection, the targeted variability expresses the difference between non-anomalous and anomalous calls. The most obvious target labels indicate if an audio stream is anomalous or not. The target labeling can also focus on other properties specific to the anomalous calls such as channel specific characteristics of a call audio stream, e.g. codec conversion, noise, background noise, radio interference, delay, crosstalk, clipping, packet loss concealment and interworking of voice activity detection, and/or voice characteristics of a call audio stream, e.g. speaker identity, variation of speaker identities between calls and/or speaker accents/dialects.

Ideally, anomalous telephone call target labels are determined for the complete training plurality of audio streams. However, labeling large amounts of data is prohibitive. Covering target label types of other underlying audio characteristics related to anomalous telephone calls is difficult to achieve as well. Therefore, in a first preferred embodiment, the model for embedding extraction is determined in an unsupervised way which does not require extra target labels. Additional metadata that is optionally extracted in an automated way, can still be used to construct a training plurality of audio streams with sufficient variety.

In a first preferred embodiment, the model is configured for representing in the embedding vector variability over the training plurality of first sets of multiple features, without particularization to detecting anomalous telephone calls. The target variability criterion hence preferably expresses variability without consideration to the purpose of detecting anomalous telephone calls. Any labels associated with the training plurality of audio streams are hence preferably not taken into account for determining the model. Preferably, the model is configured solely based on the audio streams of the training plurality of audio streams, and not on any labels associated therewith. Preferably, the model is based on a Universal Background Model (UBM) comprising a Gaussian Mixture Model. Preferably, the embedding vector is an i-vector.

This corresponds to unsupervised training of the model for embedding extraction based on the training plurality of first sets of multiple features.

A detailed specification of an exemplary model based on a Universal Background Model comprising a Gaussian Mixture Model can be retrieved in Reynolds, Quatieri and Dunn, entitled "*Speaker Verification Using Adapted Gaussian Mixture Models*", in Digital Signal Processing 10, 19-41 (2000), doi: 10.1006/dspr.1999.0361. A detailed specification of an exemplary model based on an i-vector can be retrieved in Najim Dehak et al., entitled "*Front-end factor analysis for speaker verification*" in IEEE Transactions on Audio Speech and Language Processing 19(4):788-798 June 2011, DOI: 10.1109/TASL.2010.2064307.

In the first preferred embodiment, the first set of features may comprise:
features derived from a power spectrum of at least a portion of the call audio stream;
speaker-dependent features suitable for speaker recognition and/or speaker differentiation;
a coefficient such as Mel Frequency Cepstral Coefficients (MFCC);
the call audio stream; or
a compressed representation of the call audio stream in the time domain.

In a second preferred embodiment, alternative to the first, the model is configured for representing in the embedding vector variability over the training plurality of first sets of multiple features, with particularization to detecting anomalous calls. The target variability criterion hence preferably expresses variability with consideration to the purpose of detecting anomalous telephone calls. Any labels associated with the training plurality of audio streams are hence preferably taken into account for determining the model. Preferably, the model is configured based on the audio streams of the training plurality of audio streams and the labels associated with the training plurality of audio streams. Preferably, the model is based on a Deep Neural Network embedding. Preferably, the embedding vector is an x-vector.

This corresponds to supervised training of the model for embedding extraction based on the training plurality of first sets of multiple features.

A detailed specification of an exemplary model based on Deep Neural Network embedding can be retrieved in Snyder, Garcia-Romero, Sell, Povey and Khudanpur, entitled "*X-Vectors: Robust DNN Embeddings for Speaker Recognition*", in 2018 *IEEE International Conference on Acoustics, Speech and Signal Processing (ICASSP)*, doi: 10.1109/ICASSP.2018.8461375.

In the second preferred embodiment, the first set of features may comprise:
features derived from a power spectrum of at least a portion of the call audio stream;
speaker-dependent features suitable for speaker recognition and/or speaker differentiation;
a coefficient such as Mel Frequency Cepstral Coefficients (MFCC);
the call audio stream; or
a compressed representation of the call audio stream in the time domain.

In a third alternative embodiment, the first set of features are directly used in a Deep Neural Network to detect the occurrence or non-occurrence of anomalous telephone calls. Anomalous telephone call target labels associated with the training plurality of audio streams are taken into account for configuring the model. This model implicitly constructs an embedding vector in the layers preceding the output layer that generates the decision for the analyzed audio stream. The Deep Neural Network layers subsequent to this embedding layer play the role of the backend-classifier described in the next section. In this embodiment the model for embedding extraction and the back-end classifier are thus simultaneously determined.

In an alternative embodiment features are directly used in a statistical classifier such as a GMM.

This alternative embodiment does not extract an embedding vector per audio stream. Instead, a GMM model is configured per category that needs to be identified. In the case of anomalous telephone call detection, two GMM models can be trained, one for an anomalous calls category and one for a non-anomalous calls category.

The category of the GMM model that fits the best (produces the highest likelihood score) to the analyzed audio stream out of all considered GMM models, is predicted to be the category of the analyzed audio stream.

The alternative embodiments are not preferred as they do not allow to analyze multiple audio streams with an identical subscriber identity without the need to store all corresponding audio streams or the corresponding set of first features. All relevant information of each audio stream is described in the embedding vector. To analyze multiple audio streams of the same subscriber in a more efficient way, the preferred embodiments can be used to extract the embedding vector. Only this embedding vector needs to be stored for potential future analysis of the telephone call, and the corresponding audio stream or the corresponding set of first features do not need to be stored.

To capture all underlying factors that characterize the difference between a non-anomalous telephone call and an anomalous telephone call, the model for embedding extraction should have the potential to focus on all audio stream characteristics specific to an anomalous telephone call. For a complete analysis of underlying causes of a positive anomalous call detection, the embodiment describing the supervised training of the model for embedding extraction with target labels describing the occurrence or non-occurrence of an anomalous telephone call is preferred.

A model configured based on a training plurality of first sets of multiple features derived from a corresponding training plurality of audio streams, wherein each audio stream of the training plurality of audio streams is associated with a label denoting either one of occurrence or non-occurrence of an anomalous telephone call, is advantageous as it allows to automatically capture further factors which differ between anomalous and regular calls. A non-limiting list of examples of such factors might include fictitious calls (in case of revenue share fraud), background noise (as for international calls typically a quieter environment is utilized), language-related artifacts (e.g. Portuguese and Mandarin having a vastly different sound spectrum), and call setup behavior (as a SIM box in essence performs two calls, of which the call audio streams are appropriately connected).

It is clear for a person of ordinary skill in the art that fictitious calls are not only useful in case of revenue share fraud.

In this respect, the Applicant deems that the present invention is not only suitable for detecting interconnect bypass fraud, but may also be suitable for detecting other types of anomalous telephone calls (e.g. revenue share fraud). Where in the context of the broader class of anomalous telephone calls, analysis of the call audio stream originating from a calling party is described, one of ordinary skill in the art will appreciate that alternatively or additionally analysis of a call audio stream of another party participating in the telephone call may be performed.

Furthermore, a call audio stream can include various codecs and thus transcoding from one codec to another. This is particularly the case in case of interconnect bypass fraud. Applicant deems that the present invention is also suitable for detecting transcoding.

Anomalous Telephone Call Detection, e.g. Interconnect Bypass Fraud Detection

In a preferred embodiment, the occurrence, or probability of occurrence, of an anomalous telephone call is determined based on a back-end classifier with the embedding vector as input. Preferably, the classifier is a set of Gaussian Models with shared covariance matrix, called a Gaussian Backend Model, a set of Gaussian Mixture Models, a Support Vector Machine or a Feed-Forward Neural Network. Most preferably, the classifier is a set of Gaussian Models with shared covariance matrix, called a Gaussian Backend Model.

For clarity, the models used in the classifier are separate and different from the model used to convert the first set of features in the embedding vector.

In a preferred embodiment, the back-end classifier is configured based on: a training plurality of embedding vectors corresponding with the training plurality of first sets of multiple features derived from the corresponding training plurality of audio streams; and the labels corresponding with the audio streams of the training plurality of audio streams.

In a preferred embodiment, the call is associated with a subscriber identity and/or a first user device, wherein the call audio stream is outgoing with respect to a device associated with the subscriber identity and/or said first user device. Preferably, said device associated with the subscriber identity is said first user device. One of ordinary skill in the art will appreciate that in this document, user device may also refer to a SIM box. In this embodiment, in case of detection of an anomalous telephone call based on the determined occurrence, or the probability of occurrence, the subscriber identity and/or first user device is blacklisted.

In a preferred embodiment, the call is associated with a subscriber identity and/or a first user device, wherein the call audio stream is incoming with respect to a second device. Preferably, said device associated with the subscriber identity is said first user device. One of ordinary skill in the art will appreciate that in this document, user device may also refer to a SIM box. In this embodiment, in case of detection of an anomalous telephone call based on the determined occurrence, or the probability of occurrence, the subscriber identity and/or first user device is blacklisted.

The subscriber identity may, for example, be determined based on a Subscriber Identity Module (SIM) card. A SIM card may be associated with a pre-paid or a post-paid subscription model, wherein the former does not always require identification of a natural or legal person. One of ordinary skill in the art will hence appreciate that subscriber identity refers to an identity for usage of a telephone network, but does not necessarily refer to an identity of a natural or legal person.

In a preferred embodiment, the step of analyzing a call associated with a subscriber identity and/or a first user device is based on metadata associated with the call.

In a preferred embodiment, the step of analyzing a call associated with a subscriber identity and/or a first user device is based on heuristic rules based on metadata associated with the call.

In a preferred embodiment, the step of analyzing a call associated with a subscriber identity and/or first user device comprises the steps of:

determining whether analysis is required based on metadata such as an activation date associated with the subscriber identity, a subscription model associated with the subscriber identity (e.g. pre-paid or post-paid subscription model), whether said call is an international call (e.g. in which case interconnect bypass fraud may be precluded), metadata provided by signaling information or billing information such as in billing CDR (Call Detail Records) and/or a previous usage of said subscriber identity in association with said first user device; and in case of required analysis, performing said steps of: obtaining the audio stream; deriving the first set of multiple features; determining occurrence, or a probability of occurrence, of an anomalous telephone call, in particular interconnect bypass fraud.

It may occur that the determined occurrence, or probability of occurrence, of an anomalous telephone call is indefinite for detection based on a single call. This may be the case, for example, when a probability of occurrence is lower than a predetermined threshold. In this case, for multiple calls associated with the same subscriber identity and/or first user device at least the steps of obtaining the call audio stream; deriving a first set of multiple features; optionally, deriving an embedding vector of multiple features, are performed for each call. A speaker similarity or variability value (e.g. number of different speakers over the multiple calls) is determined based on the features, preferably based on the embedding vectors associated with the corresponding calls. Occurrence, or probability of occurrence, of an anomalous telephone call is then additionally determined based on the determined speaker similarity or variability value.

The determination of speaker differentiation over multiple calls is performed for calls associated with the same subscriber identity and/or first user device. This allows for a number of computational optimizations in comparison to speaker recognition over a larger amount of calls, e.g. all calls irrespective of subscriber identity and/or first user device. Firstly, the number of pairwise comparisons can be significantly reduced. Secondly, the amount and/or quality of stored features need not be as high, as the feature space is less densely populated with a smaller amount of speakers and/or a smaller amount of calls. Moreover it is sufficient to be able to distinguish different speakers, with a much lower and asymmetric accuracy requirement to speaker identification used commonly for authentication purposes. Accuracy requirement is asymmetric in that a false identical classification is not critical. The first and second considerations have also to be viewed with respect to the goal of detecting interconnect bypass fraud within the initial three calls, i.e. the amount of calls to compare is very limited.

EXAMPLES

The invention is further described by the following non-limiting examples which further illustrate the invention, and are not intended to, nor should they be interpreted to, limit the scope of the invention.

Example 1: Embodiment

Figure 2:
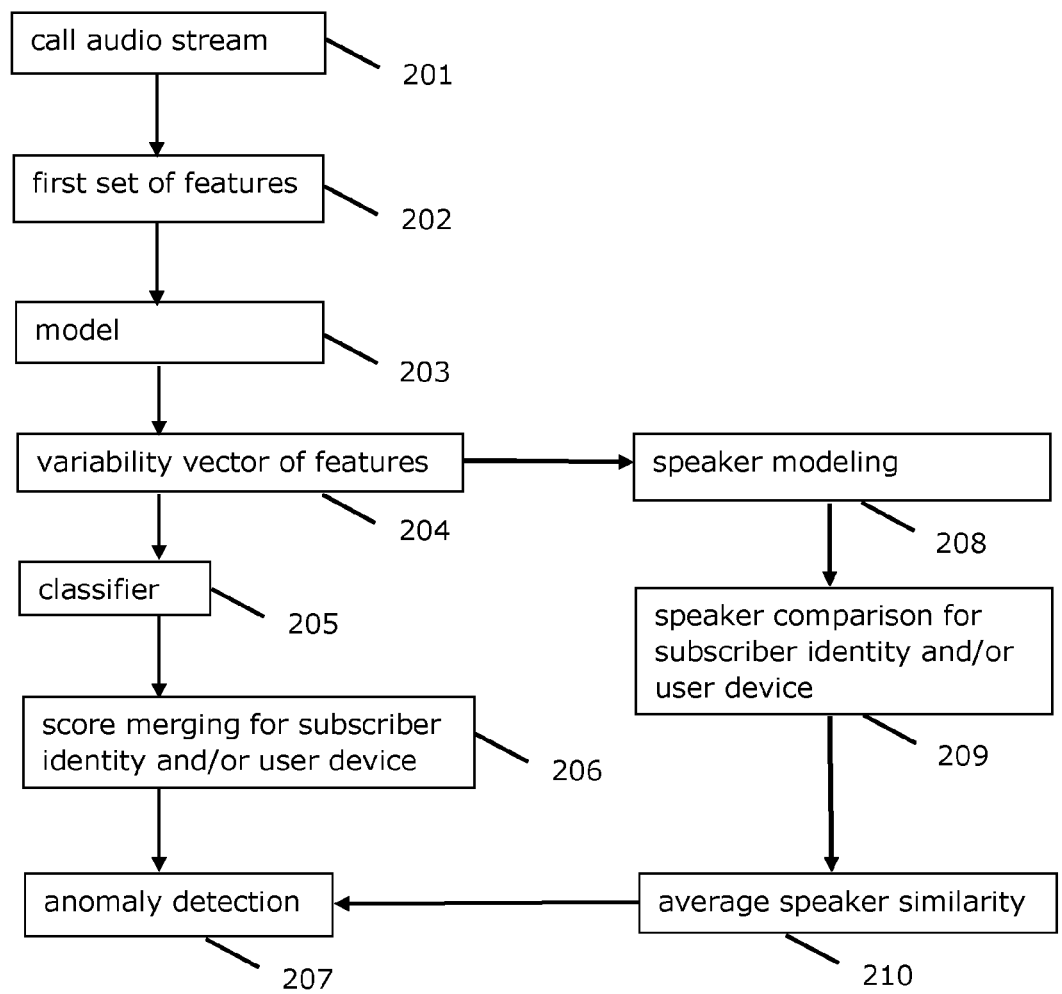
FIG. 2 shows a schematic overview of a preferred embodiment.

Reference is made to FIG. 2.

A telephone call associated with at least two user devices is analyzed. The call is analyzed remote from the at least two user devices, in particular at infrastructure of a telephone service provider. A caller user device of said at least two user devices has initiated the telephone call. The caller user device is associated with a SIM card.

Based on metadata, in particular the SIM card, and more in particular:
an activation date associated with the SIM card,
a subscription model associated with the SIM card,
billing or signaling information, and
whether the call is an international call,
it is determined whether analysis is required. In case of required analysis, the subsequent steps in this example are performed.

A call audio stream which is outgoing with respect to the caller user device is obtained (201). From the call audio stream, a first set comprising MFCC is derived (202). The first set is converted via a model (203) to an embedding vector (204), wherein the embedding vector and the first set differ. The model is most preferably based on a Universal Background Model comprising a Gaussian Mixture Model. The embedding vector is most preferably an i-vector.

The model has previously, i.e. before the telephone call under analysis, been configured based on a training plurality of first sets comprising MFCC, which have previously been derived from a corresponding training plurality of audio streams. Each audio stream of the training plurality of audio streams is associated with a label denoting either one of occurrence or non-occurrence of an anomalous telephone call. In case the model is based on a Universal Background Model, it is not required to associate the training plurality of audio streams with a label because the model can be built unsupervised. Although time- and resource-consuming, such a training plurality of audio streams may be obtained with known methods in the art.

The embedding vector (204) is input to a back-end classifier (205), in particular a Gaussian Backend Model, comprising two Gaussian models with a shared covariance matrix. A score is obtained based on the back-end classifier. The presently obtained score may optionally be merged (206) with one or more previously obtained scores associated with the same SIM card, in case the latter is retrievable in a corresponding database, e.g. when previous calls associated with the SIM card have previously been analyzed. The present score is stored in the database in association with the SIM card, for future retrieval.

The embedding vector (204) is optionally converted to a speaker factor (208) based on a target variability criterion, more precisely a target speaker variability criterion. If this optional step is not performed, speaker factor in what follows is to be understood as being the embedding vector. The presently obtained speaker factor (208) is compared (209) with one or more previously obtained speaker factors associated with the same SIM card, in case the latter is retrievable in a corresponding database, e.g. when previous calls associated with the SIM card have previously been analyzed. In particular, a speaker similarity or variability score (210), which is normalized (averaged) with respect to the number of calls associated with the SIM card, is determined. The present speaker factor (208) is stored in the database in association with the SIM card, for future retrieval.

Based on the score or merged score, as the case may be, and the speaker similarity or variability value in case of multiple calls associated with the same SIM, a probability of occurrence of an anomalous telephone call, in particular interconnect bypass fraud, is determined (207).

Based on a comparison of the probability and a predetermined threshold, the telephone call is determined to be an anomalous telephone call or not, and in the former case, the SIM card is blocked from making further calls.

Example 2: Embodiment

A preferred embodiment of a first set of features is disclosed in this example.

Mel Feature Cepstral Coefficient (MFCC) feature extraction is performed on a targeted audio channel of an audio stream.

Information of temporal dynamics can be added by including delta Δ, delta delta ΔΔ and/or shifted delta coefficients (SDC) to MFCC frames.

Speech frames may be selected through Voice Activity Detection (VAD) and/or speech/non-speech segmentation, as frames corresponding to silence and other non-speech sounds may comprise irrelevant information. Voice Activity Detection can be realized by applying a selection threshold to the normalized energy component, e.g. selection of frames with a log-energy above the time-averaged log-energy in the 5 second sliding window. More advanced selection schemes may perform model-based speech/non-speech segmentation prior to the VAD-based frame selection. Due to the model-based approach and larger analysis context, long continuous speech segments can be detected more robustly. Only energy-rich frames within these detected speech segments are then selected. An example of model-based speech/non-speech segmentation is described in Desplanques and Martens, entitled "*Model-based speech/non-speech segmentation of a heterogeneous multilingual TV broadcast collection*", in 2013 *IEEE International Symposium on Intelligent Signal Processing and Communication Systems (ISPACS)*, doi: 10.1109/ISPACS.2013.6704522.

The features of the (selected) MFCC frames can be normalized through Cepstral Mean Subtraction (CMS), Cepstral Mean and Variance Normalization (CMVN) or feature warping (Gaussianization).

Example 3: Embodiment

A preferred embodiment of a model is disclosed in this example.

The model is used to convert a first set of features to an embedding vector of multiple features.

A Gaussian Mixture Model (GMM) is built based on a training plurality of audio streams and acts as a Universal Background Model (UBM). This UBM training process does not require labels and therefor produces a generic model of telephone speech.

The model is not specialized towards certain speakers or channels. However, the training data is typically balanced towards a wide range of different speakers and channel conditions. The model can be trained on the (selected) MFCC frames described in the Example 2 Embodiment. The GMM typically contains between 16 and 2048 Gaussian components.

Audio stream specific deviations from the UBM allow to characterize properties of that given audio stream. An i-vector extractor model is built based on the (balanced) training plurality of audio streams to model this variability. This training process does not require labels, but does require one first set of (MFCC) features per training audio stream or one first set of features per homogenous parts of the audio stream. The i-vector extractor model allows for the extraction of a fixed-length embedding vector per audio stream or homogeneous part of the audio stream. The embedding vectors can be mean normalized, whitened and length-normalized before further processing. In the case of interconnect bypass fraud targeted sources of variability are speaker-variability and channel-variability. The dimension of the embedding vectors is typically set to 128 to 2048.

A set of Gaussian models called a Gaussian Backend Model is constructed on a training plurality of audio streams with the goal to extract the channel-specific information from the i-vectors. Each pre-defined channel category corresponds with one Gaussian. A covariance matrix can be shared across the models within the set. In the case of interconnect bypass fraud, the embedding vector of the analyzed audio stream is scored with the model of the anomalous audio streams and the model for the non-anomalous audio streams.

The set of Gaussian models is the back-end classifier to determine the occurrence, or probability of occurrence, of an anomalous telephone call with an i-vector, the embedding vector, as input.

Speaker identity conveys information about potential interconnect bypass fraud, therefore a Probabilistic Linear Discriminant Analysis (PLDA) model is constructed on a training plurality of audio streams to score speaker similarity between i-vectors associated with the same subscriber identity. The PLDA model generates a log-likelihood ratio comparing the log-likelihood of a same-speaker hypothesis versus the log-likelihood of a different-speaker hypothesis between two or multiple audio streams. Cosine similarity scoring between i-vectors can be used to achieve a similar goal. Each pair of audio streams associated with the same subscriber identity is scored with the PLDA model and this score is averaged across all possible pairwise comparisons. This final speaker similarity score is compared against a threshold that is optimized towards the desired detection error tradeoff. The PLDA model training and evaluation procedure are described in Prince and Elder, entitled "*Probabilistic Linear Discriminant Analysis for Inferences about Identity*", in 2007 *IEEE International Conference on Computer Vision*, doi: 10.1109/ICCV.2007.4409052. The dimension of the speaker factor vectors that lie in this speaker variability subspace is typically set to 25-250.

The channel-specific score and speaker similarity score can be merged to one single score. This enables the use of a single detection threshold.

Example 4: Test Results Interconnect Bypass Fraud

The embodiments described above are evaluated by means of two-fold stratified cross-validation on a training plurality of audio streams. One half of the training set is used to estimate the model parameters. The models are evaluated on the other half of the training set. This procedure is executed a second time with the roles of the training data and evaluation data reversed. The evaluation results of the two steps are merged to obtain the final evaluation metrics.

The interconnect bypass fraud detection threshold is tuned for an equal cost between a false alarm rate and a miss rate. This detection error tradeoff models the scenario of a pre-selection of potentially anomalous audio streams by other detection algorithms.

Figure 3:
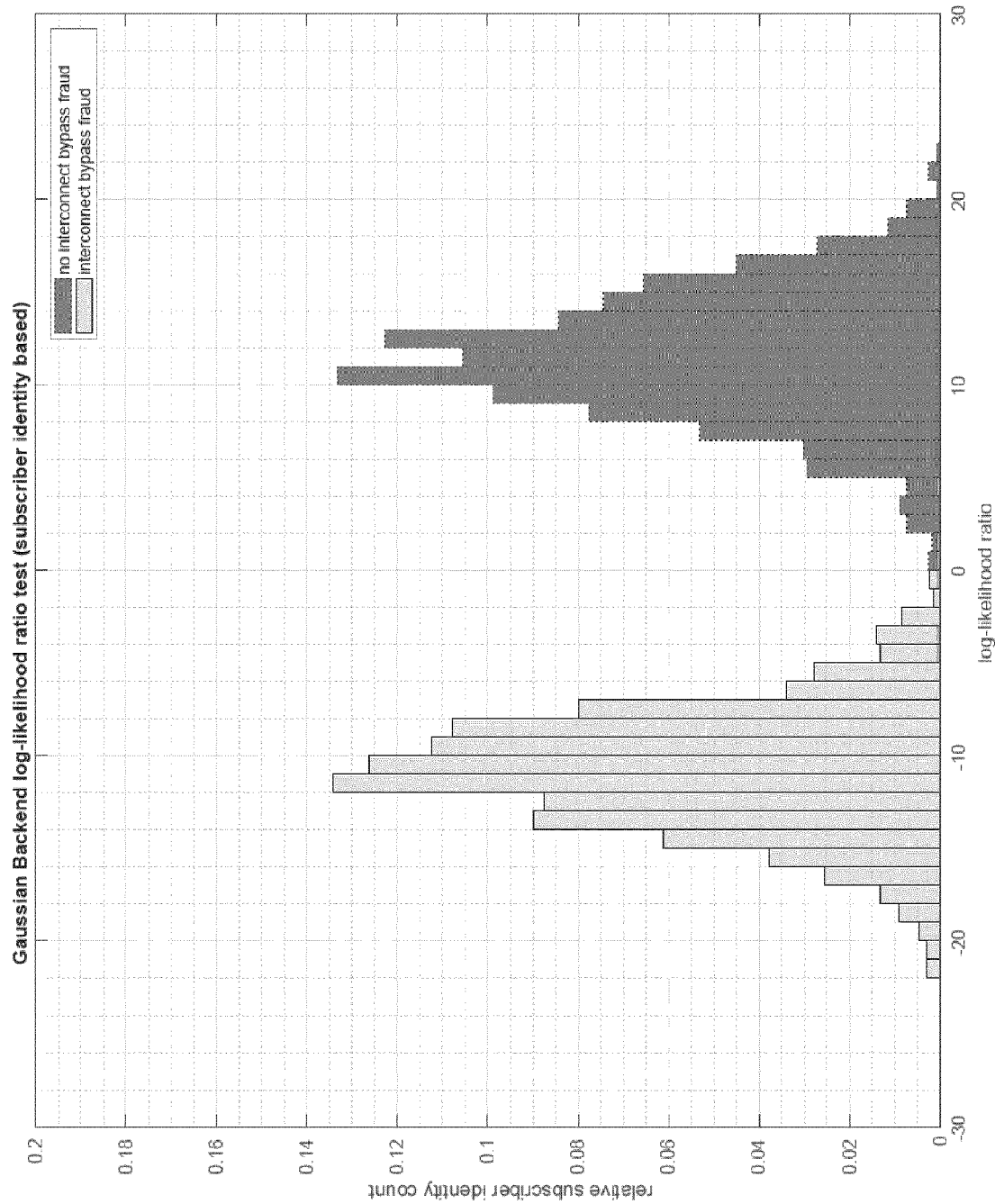
FIG. 3 shows a distribution of test scores of a preferred embodiment targeting detection of channel-specific artefacts related to interconnect bypass fraud given up to 3 calls per subscriber identity.
Figure 4:
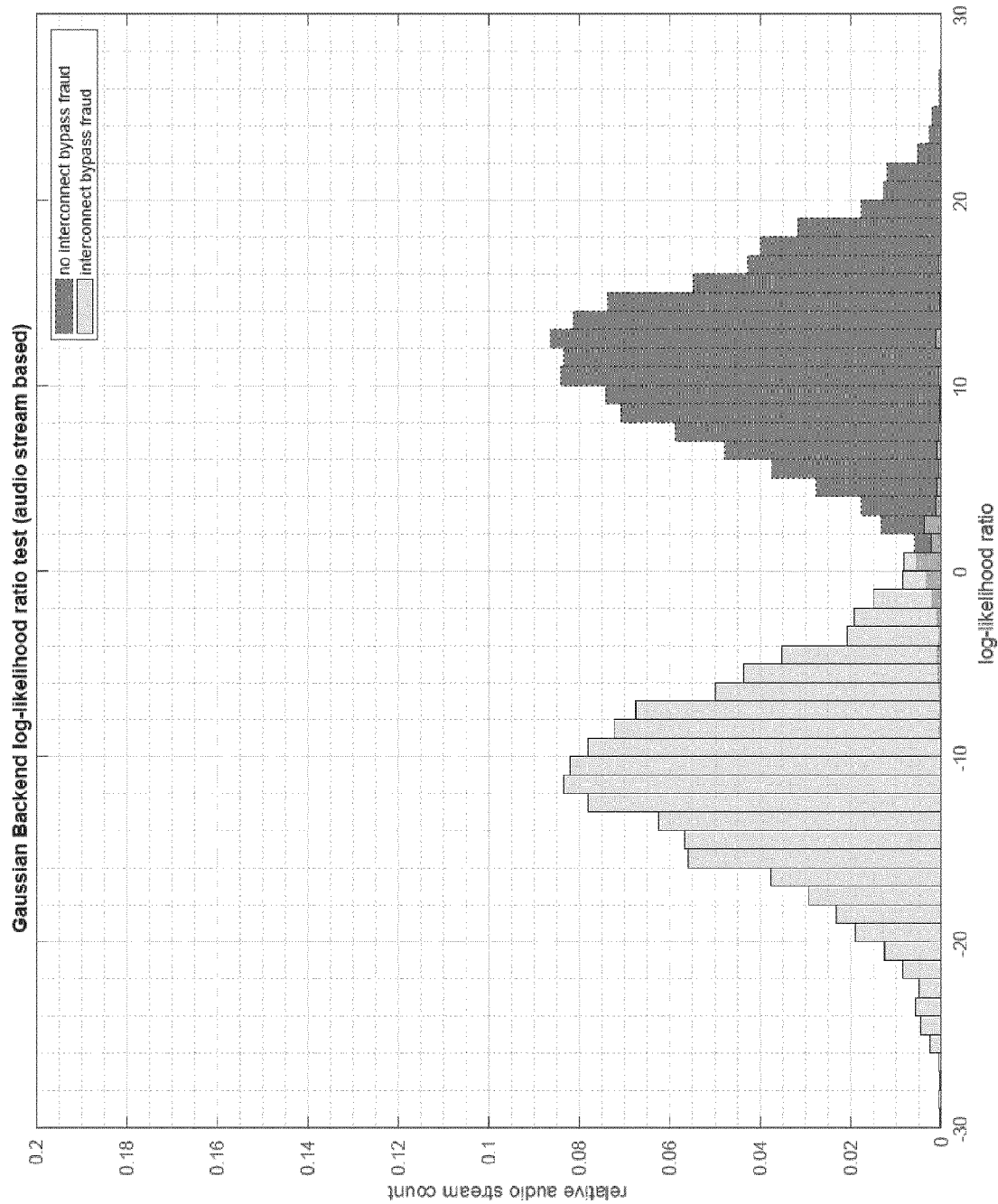
FIG. 4 shows a distribution of test scores of a preferred embodiment targeting detection of channel-specific artefacts related to interconnect bypass fraud given only 1 call per subscriber identity.
Figure 5:
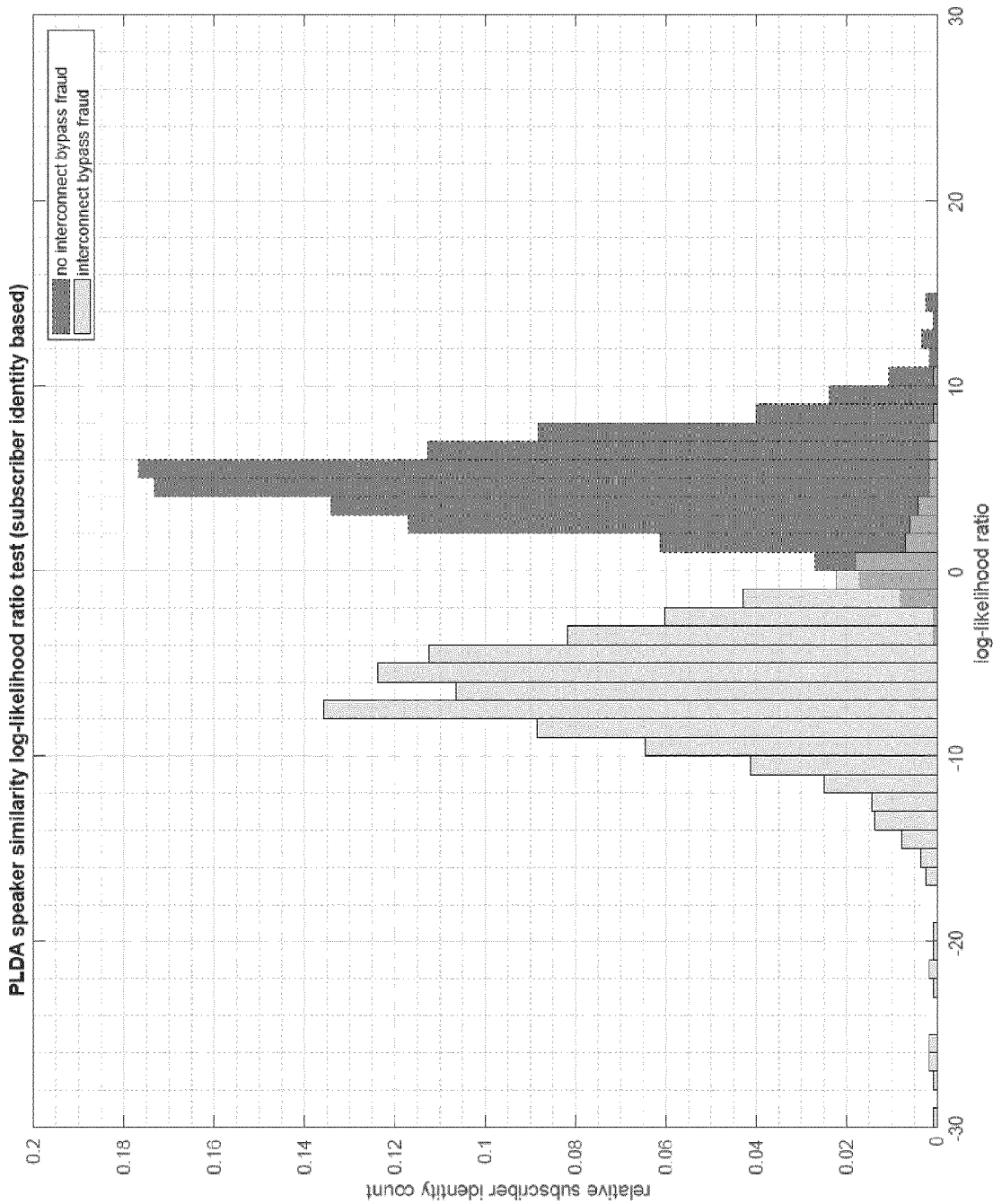
FIG. 5 shows a distribution of test scores of a preferred embodiment targeting detection of multiple speaker identities related to interconnect bypass fraud given up to 3 calls per subscriber identity.

The detection of interconnect bypass fraud by means of a Gaussian Backend Model achieves an accuracy of 99.6%, a recall on fraud of 99.7% and a precision on fraud of 99.6% with 2-fold cross validation on the training set. The distribution of the Gaussian Backend log-likelihood ratio test scores on the two validation sets is depicted in FIG. 3. A test score lower than zero indicates that fraud has an occurrence probability of more than 50% for the evaluated subscriber identity. A Gaussian Backend detection performed per audio stream instead of per subscriber identity yields an accuracy of 98.6%, a recall on fraud of 98.7% and a precision on fraud of 98.5%. The distribution of the audio stream based log-likelihood ratio test scores is depicted in FIG. 4. The detection of interconnect bypass fraud by means of PLDA speaker similarity scores achieves an accuracy of 95.0%, a recall on fraud of 94.7% and a precision on fraud of 95.2% with 2-fold cross validation on the training set. The distribution of the PLDA speaker similarity log-likelihood ratio test scores on the two validation sets is depicted in FIG. 5.

The invention claimed is:

1. A computer-implemented method for detecting an anomalous telephone call, comprising the step of analyzing a telephone call associated with at least two user devices, wherein the telephone call is analyzed remote from the at least two user devices, wherein the analysis of the telephone call comprises the steps of:
   a) obtaining a call audio stream of said telephone call;
   b) deriving from the call audio stream a first set of multiple features;
   c) converting the first set of features to an embedding vector of multiple features, wherein the embedding vector and the first set differ, wherein the first set of features is converted via a model to an embedding vector of multiple features, wherein the model is configured based on a training plurality of first sets of multiple features derived from a corresponding training plurality of audio streams, wherein the model is configured for representing in the embedding vector variability over the training plurality of first sets of multiple features, without particularization to detecting anomalous telephone calls; and
   d) determining occurrence, or a probability of occurrence, of an anomalous telephone call based on the embedding vector.

2. The computer-implemented method according to claim 1, wherein the first set of multiple features comprises speaker-dependent features suitable for speaker recognition and/or speaker differentiation.

3. The computer-implemented method according to claim 1, wherein the first set of multiple features comprises features derived from a power spectrum of at least a portion of the call audio stream.

4. The computer-implemented method according to claim 1, wherein the first set of features comprises Mel Frequency Cepstral Coefficients (MFCC).

5. The computer-implemented method according to claim 1, wherein the model is based on a Universal Background Model comprising a Gaussian Mixture Model, wherein the embedding vector is an i-vector.

6. The computer-implemented method according to preceding claim 1, wherein the model is configured for representing in the embedding vector variability over the training plurality of first sets of multiple features, with particularization to detecting anomalous telephone calls.

7. The computer-implemented method according to claim 1, wherein the model is based on a Deep Neural Network embedding, wherein the embedding vector is an x-vector.

8. The computer-implemented method according to claim 1, wherein the occurrence, or probability of occurrence, of an anomalous telephone call is determined based on a back-end classifier with the embedding vector as input, preferably wherein the back-end classifier is a set of Gaussian Models with shared covariance matrix, called a Gaussian Backend Model, a set of Gaussian Mixture Model, a Support Vector Machine or a Neural Network.

9. The computer-implemented method according to claim 1, wherein each audio stream of the training plurality of audio streams is associated with one or more labels denoting either one of occurrence or non-occurrence of an anomalous telephone call, wherein a back-end classifier is configured based on: a training plurality of embedding vectors corresponding with the training plurality of first sets of multiple features derived from the corresponding training plurality of audio streams; and the one or more labels.

10. The computer-implemented method according to claim 1, wherein the call is associated with a subscriber identity and/or a first user device, wherein the call audio stream is outgoing with respect to a device associated with the subscriber identity and/or said first user device, wherein in case of detection of an anomalous telephone call based on the determined occurrence, or the probability of occurrence, the subscriber identity and/or first user device is blacklisted.

11. The computer-implemented method according to claim 10, wherein the step of analyzing a call associated with a subscriber identity and/or a first user device comprises the steps of: determining whether analysis is required based on an activation date associated with the subscriber identity, a subscription model associated with the subscriber identity, whether said call is an international call, metadata based on billing or signaling data and/or a previous usage of said subscriber identity; and in case of required analysis, performing the analysis steps (a) to (d).

12. The computer-implemented method according to claim 10, wherein the determined occurrence, or probability of occurrence, of an anomalous telephone call is indefinite based on a single call, wherein for multiple calls associated with the same subscriber identity and/or first user device at least steps (a) to (c) are performed for each call, wherein a speaker similarity or variability value is determined based on embedding vectors associated with the corresponding calls, wherein occurrence, or probability of occurrence, of an anomalous telephone call is determined based on the determined speaker similarity or variability value.

13. The computer-implemented method according to claim 1, wherein the call is associated with a subscriber identity and/or a first user device, wherein the call audio stream is incoming with respect to a second device, wherein in case of detection of an anomalous telephone call based on the determined occurrence, or the probability of occurrence, the subscriber identity and/or first user device is blacklisted.

14. The computer-implemented method according to claim 1, wherein detecting an anomalous telephone call is detecting interconnect bypass fraud, and wherein occurrence of an anomalous telephone call is occurrence of interconnect bypass fraud.

15. The computer-implemented method according to claim 1, wherein detecting an anomalous telephone call is detecting revenue share fraud, and wherein occurrence of an anomalous telephone call is occurrence of revenue share fraud.

16. The computer-implemented method according to claim 1, wherein detecting an anomalous telephone call is detecting transcoding, and wherein occurrence of an anomalous telephone call is occurrence of transcoding.

17. A computer system for detecting an anomalous telephone call, wherein the computer system comprises means configured for carrying out the method according to claim 1.

* * * * *